United States Patent Office 2,966,530
Patented Dec. 27, 1960

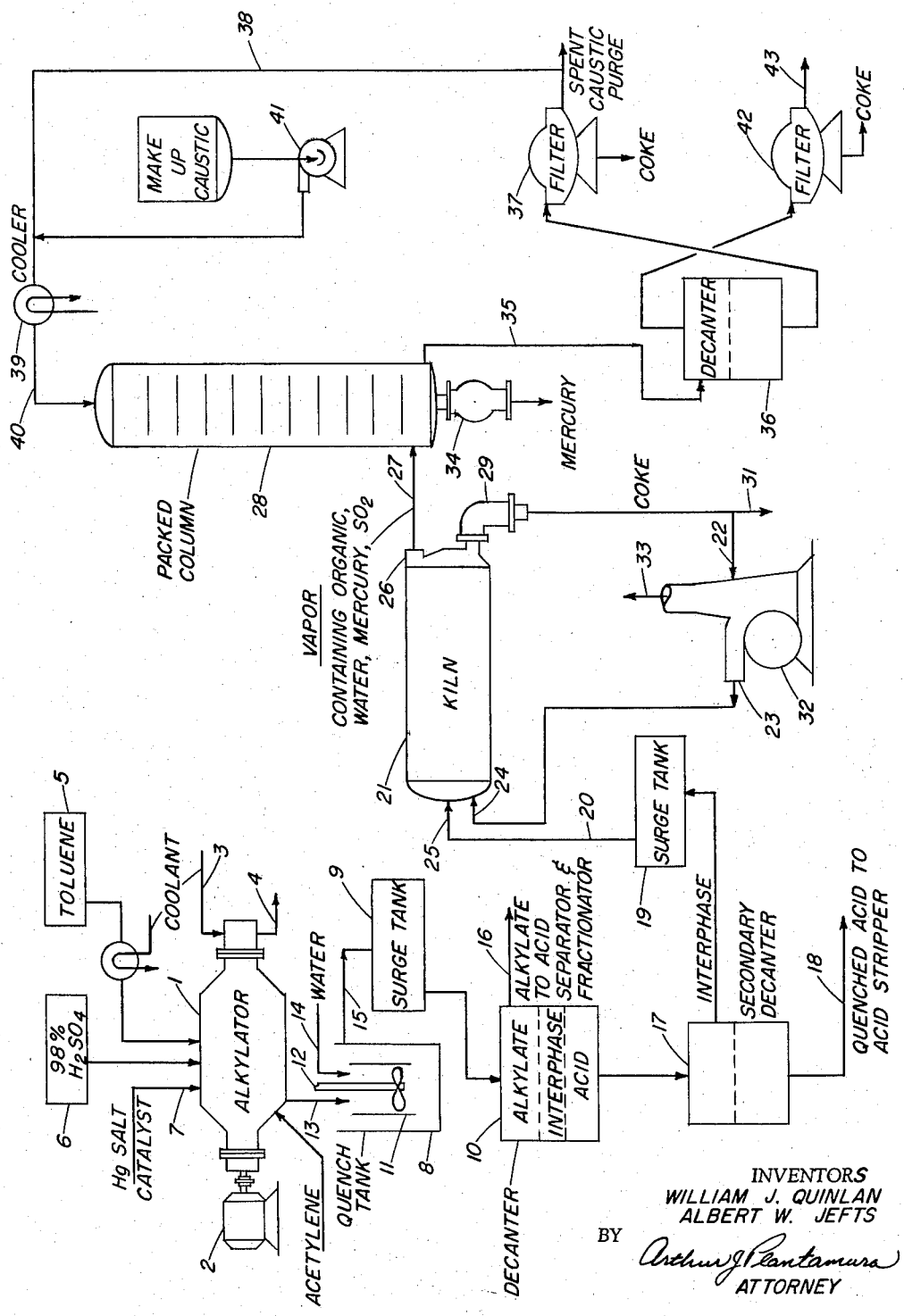

2,966,530

TREATMENT OF ALKYLATION INTERPHASE

William J. Quinlan, Stamford, and Albert W. Jefts, Glenville, Conn., assignors to American Cyanamid Company, New York, N.Y., a corporation of Maine Filed July 13, 1959, Ser. No. 826,603

4 Claims. (Cl. 260—668)

This invention relates to improvements in the separation and recovery of products and by-products of alkylation reactions. More particularly, the invention relates to the treatment of acid sludge obtained as a by-product in a strong acid-mercury salt catalyst system in which saturated and unsaturated compounds are coreacted. The invention will be described in connection with the treatment of acid sludge derived from the production of diarylalkane from acetylene and alkyl substituted aromatic compounds, in particular toluene, using a sulfuric acid-mercury salt catalyst. The invention, however, is concerned essentially with a strong acid sludge containing alkylate tarry residues and mercury and the concept herein involved may be applied to sludges having the above requisite characteristics derived from other alkylate reactions.

Ditolylethane is produced commercially as an intermediate from which methylstyrene is obtained. In one commercial process for the production of this intermediate, acetylene is introduced into admixture with a substantial excess of toluene using strong sulfuric acid containing a mercury salt such as mercuric chloride or mercuric sulfate as catalyst; this process is described in U.S. Patent No. 2,734,928, dated February 14, 1956. High yields of ditolylethane are obtained, but in the practical operation of the process it is necessary to recover and recycle the excess toluene. It is also highly desirable to recover the sulfuric acid in a commercially useful form, which necessitates the removal of the mercury and tars formed during the alkylation reaction.

The alkylator effluent from the sulfuric acid-mercuric salt catalyzed reaction of toluene and acetylene is a mixture of toluene, ditolylethane, sulfuric acid, toluene sulfonic acid (TSA), water, tars and mercury. The alkylator effluent, as described more in detail in the pending application of Wozniak et al., Serial No. 762,429, filed on September 22, 1958, is thoroughly quenched with controlled amounts of water immediately after the alkylation reaction is completed.

The effect of the quenching treatment described in the aforementioned patent application is to reduce undesired sulfonation substantially by mixing controlled amounts of water with the effluent. This controlled addition of water, or quenching, produces an effective physical separation of tars and mercury as an interphase layer between the upper alkylate product and the bottom acid layer in the separator. The formation and removal of this interphase layer results in a lower content of tar and mercury in the by-product acid from the process. The present invention is concerned essentially with the treatment of this interphase layer which, although smaller in quantity than either the top or bottom layers, contains a major proportion of tars and most of the mercury from the combined alkylator effluent. The invention comprises generally the roasting of the alkylator interphase layer to vaporize the mercury and convert the organic tar to a solid innocuous coke which is readily disposable. Heretofore, the disposition of the interphase layer has presented considerable difficulty because (1) the large mercury content therein imposed a serious waste disposal problem and (2) the large concentration of relatively expensive mercury catalyst therein made recovery of this metal therefrom extremely important from an economic standpoint.

It is an object of the present invention to provide a novel method for recovery of mercury from the alkylator interphase. It is a further object of the invention to avoid the problem of disposing of contaminating tars of the alkylator interphase layer and to provide a means for converting the composition of this layer to useful products. Other objects and advantages will become apparent from the description of the invention which follows.

The invention will be further described with reference to the accompanying drawing wherein the single figure is a flow sheet showing diagrammatically a process for the production of ditolylethane and illustrates more in detail the treatment of the by-product comprising the alkylate interphase.

Referring to the drawing, the alkylator is indicated generally by reference numeral 1. This is a reaction vessel equipped with an agitator operated by a motor 2 and with internal cooling coils through which a suitable coolant such as liquid ammonia is introduced and withdrawn as through lines 3 and 4, respectively. The alkylator is charged continuously with a stream of toluene from a toluene storage tank 5, a stream of strong sulfuric acid from tank 6, and a stream of mercuric sulfate or other mercury salt along with sufficient water at 7 to bring the sulfuric acid concentration within the alkylator to about 95% $H_2SO_4$. The resulting mixture is maintained at a temperature in the range of from about $-10°$ C. to about $10°$ C. while acetylene is continuously introduced and reacted with the toluene. It will be understood that this process can be carried out in a single alkylator or in a series of stages as described in the patent referred to above.

In accordance with the improvement described in the copending application, Serial No. 726,429 noted above, a quench tank 8 is interposed between the alkylator 1 and the separating tank or decanter 10 to effect a substantial reduction in sulfonation which results in the formation of toluene sulfonic acid. The quench tank is preferably a cylindrical vessel containing a central vertical baffle 11 and an agitator 12 to promote rapid and thorough mixing of water with the alkylator effluent. A stream of this effluent and a stream of water are preferably discharged into the quench tank within the central baffle through lines 13 and 14, respectively, while the quenched effluent is withdrawn through an overflow line 15 to the alkylation surge tank 9 leading to the decanter 10.

Two of the main advantages obtained in the above-mentioned Wozniak et al. application by mixing quench water with the alkylator effluent, are reduction of the toluene sulfonic acid content of the acid from about 25% to about 5% or less and secondary the formation of an intermediate or interphase layer between the top layer of organic material and the bottom layer of spent acid. This interphase is considerably smaller in quantity than either the top or the bottom layer, but it contains a major proportion of the tar and most of the mercury along with minor quantities of toluene sulfonic acid and some sulfuric acid. Our invention is essentially concerned with the treatment of this interphase to recover the mercury therefrom; to convert the toluene sulfonic acid content to toluene and sulfuric acid which are materials economically advantageous as byproducts and to render the tarry residue innocuous by roasting to solid coke.

The treatment of the alkylate withdrawn at 16 from the decanter 10 is described in the Wozniak et al. application. This upper phase is introduced into an acid separator where the alkylate is separated, neutralized with aqueous caustic solution, in a second vessel and subsequently the ditolylethane is separated from tars in a fractionating column (not shown). The interphase layer and bottom layer may be separated from each other in the decanter 10 but in order to provide optimum control and better separation, they are preferably introduced into a secondary decanter 17. The quenched acid comprising the lower layer is withdrawn from the secondary decanter at 18 and may be steam stripped according to the procedure described in U.S. Patent 2,832,810, the vapor therefrom being scrubbed with cold aqueous caustic solution. The acid stream at 18 may alternately be used directly for applications wherein less concentrated acids are acceptable such as in fertilizer manufacture, for example.

Roasting of the interphase layer according to the invention is accomplished in any available equipment known to be suitable for this purpose, such as a rotary brick-lined kiln 21. The kiln comprises a vapor tight system to prevent escapes of toxic mercury vapor; to prevent exposure and oxidation of recoverable organics and to prevent leakage of inflammable organic vapors. Heat input to the system is by conventional means and may be accomplished by recycling coke through a direct gas-fired heater and feeding the hot coke to the kiln. The interphase is preferably fed to the kiln from the secondary decanter 17 through surge tank 19 at ambient temperatures through the line 20. Chemical reaction and colatilization of the feed stream occurs in the kiln 21. A temperature in the kiln varying from 700° F. to 1500° F. may be employed, although temperatures between 1100° F. and 1200° F. are preferably maintained in the residue formed in the kiln. As the cake progresses through the kiln, it passes through a section containing a rod mill type grinding mechanism (not shown) for size reduction of the coke formed. Hot gases are discharged through the exit end of the kiln tube 26 and fed at 27 to a caustic scrubber packed column 28 where volatiles are condensed and $SO_2$ is converted to $Na_2SO_3$. Coke is discharged at the exit end of the kiln through a gas lock 29 and disposed in part at 31. Part of the coke is preferably employed in maintaining roasting temperatures. The fraction of the hot coke discharged from the kiln is fed at 22 to the top of the coke heater 32, which is direct gas fired, withdrawn from the heater at 23 and recycled to the kiln at 24. The stack fumes are exhausted to the atmosphere at 33 through a water scrubber (not shown). Mercury is recovered in a convenient way such as by a mercury-trap 34 or by cyclone (not shown) at the bottom of the caustic scrubber 28. The organic condensate plus caustic solution discharge at 35 from the caustic scrubber 28, the organic phase being composed mostly of toluene and ditolylethane, is separated from the caustic solution by decantation at 36; the caustic solution filtered from the coke fines at 37, purged, and the filtrate is recycled at 38, cooled at 39 and returned to the caustic scrubber 28 through the line 40. Make up caustic 41 is shown being fed into the purged filtrate line 38. The decantered organic phase from 36 is filtered from the coke fines at 42 and recovered at 43.

The coke which has been filtered from the caustic streams may be recycled (not shown) to the kiln with the interphase feed. The sodium sulfite removed at the bottom of the scrubber 28 is treated as waste.

The invention will be further described and illustrated by the following specific examples. It should be understood, however, that although these examples may describe certain specific ratios of reagents and operating conditions, they are given primarily for purposes of illustration and the invention in its broader aspects is not limited thereto.

EXAMPLE 1

*Quenching and decanting*

The commercial production of ditolylethane is carried out as an essentially continuous process, the reagents being pumped continuously through one or more alkylators of the type illustrated in the drawing and a continuous stream of reaction products being discharged into the decanter 10. The present invention can best be described, however, with reference to the quantities of reagents passed through the alkylator and other equipment per unit of time.

1500 lbs. of acetylene are reacted at 5° C. with a mixture of 37,400 lbs. of toluene, 4766 lbs. of sulfuric acid, 250 lbs. of water (added with the catalyst) and 13 lbs. of mercuric sulfate (containing 8.8 lbs. of mercury) and the effluent is discharged into the quench tank where quenching water at the rate of 0.08 lb. per lb. of sulfuric acid is charged. The quenched alkylate is discharged to a decanter where alkylate is separated by gravity and removed. The acid stream is removed from the decanter and discharged to a secondary decanter where a tarry interphase, high in mercury content, is separated by gravity as a separate phase and removed. The remaining portion of the acid stream, known as bottom acid, is also discharged from the secondary decanter and steam stripped or used directly in fertilizer manufacture.

*Treatment of interphase*

The interphase layer separated from the lower acid layer and comprised of the following constituents and quantities:

| | Percent |
|---|---|
| $H_2SO_4$ | 22.9 |
| TSA | 9.5 |
| $H_2O$ | 4.6 |
| Alkylate [1] | 38.0 |
| Tar | 23.7 |
| Mercury | 1.3 |

[1] "Alkylate" is mostly a mixture of toluene and ditolylethane which is mixed up with the tars.

is roasted in the kiln maintaining a coke residue temperature of about 1100–1200° F. Temperatures in the range of from about 700° F. to about 1500° F. have also been employed. More than 98% of the mercury contained in the interphase layer is effectively separated in the mercury trap 34 from the feed processed in the packed column 28.

It will be apparent that a variety of different embodiments of the invention may be made without departing from the spirit and the scope thereof. It will, accordingly, be understood that we do not limit ourselves to the specific details which have been provided herein for purposes of illustration except as defined in the appended claims.

We claim:

1. The method of coking tars and recovering mercury from a strong acid sludge containing alkylate tarry residues and mercury which comprises roasting said sludge in a vapor tight kiln at a temperature of from about 700° F.–1500° F. to vaporize the mercury, withdrawing the reaction product comprising a vaporous phase containing mercury and tar containing diarylalkanes and a solid phase comprising coke, and separating mercury from the vaporous phase by condensing said vapor with aqueous alkali.

2. In the production of diarylalkane by the reaction of acetylene with excess of alkyl substituted aromatic compound in the presence of a dispersion of a mercury salt in strong sulfuric acid and settling the resulting alkylate mixture into three layers, a top layer containing diarylalkane and unreacted alkyl aromatic compound, an interphase layer containing a predominance of tar and mercury from the reaction, and a bottom layer containing alkyl aromatic sulfonic acid and sulfuric acid, the method of coking tars and recovering mercury from the interphase layer which comprises roasting said layer in a vapor tight kiln at a temperature of from about 700° F.–1500° F. to vaporize the mercury, withdrawing the reaction product comprising a vaporous phase containing mercury and tar containing diarylalkanes and a solid phase comprising coke and separating mercury from the vaporous phase by condensing said vapor with aqueous alkali.

3. In the production of ditolylethane by the reaction of acetylene with excess toluene in the presence of a dispersion of a mercury salt in strong sulfuric acid and settling the resulting alkylate mixture into three layers, a top layer containing ditolylethane and unreacted toluene, and interphase layer containing a predominance of tar and mercury from the reaction, and a bottom layer containing toluene sulfonic acid and sulfuric acid, the method of coking tars and recovering mercury from the interphase layer which comprises roasting said layer in a vapor tight kiln externally heated at a temperature of from about 1100–1200° F. to vaporize the mercury, withdrawing the reaction product comprising a vaporous phase containing mercury and a solid phase comprising coke, and separating mercury from the vaporous phase by condensing said vapor with aqueous alkali.

4. In the production of ditolylethane by the reaction of acetylene with excess toluene in the presence of a dispersion of a mercury salt in strong sulfuric acid and settling the resulting alkylate mixture into three layers, a top layer containing ditolylethane and unreacted toluene, an interphase layer containing a predominance of tar and mercury from the reaction, and a bottom layer containing toluene sulfonic acid and sulfuric acid, the method of coking tars and recovering mercury from the interphase layer which comprises heating said layer in a vapor tight kiln externally heated at a temperature of from about 1100–1200° F. to vaporize the mercury, withdrawing the reaction product comprising a vaporous phase containing mercury and a solid phase comprising coke, and separating mercury from the vaporous phase by condensing said vapor with aqueous sodium hydroxide solution.

References Cited in the file of this patent
UNITED STATES PATENTS

| | | |
|---|---|---|
| 2,043,646 | Bahlke | June 9, 1936 |
| 2,577,591 | Sailors | Dec. 4, 1951 |
| 2,832,810 | Smolin | Apr. 29, 1958 |
| 2,878,259 | Smolin | Mar. 17, 1959 |
| 2,897,054 | Miley | July 28, 1959 |